(12) United States Patent
Gurelli et al.

(10) Patent No.: US 11,653,358 B2
(45) Date of Patent: May 16, 2023

(54) DOWNLINK CONTROL INFORMATION TRANSMISSION WITHIN A PHYSICAL DOWNLINK SHARED CHANNEL

(71) Applicant: QUALCOMM Incorporated, San Diego, CA (US)

(72) Inventors: Mehmet Izzet Gurelli, San Diego, CA (US); Qiang Wu, San Diego, CA (US); Iyab Issam Sakhnini, San Diego, CA (US); Jun Ma, San Diego, CA (US); Ahmed Abdelaziz Ibrahim Abdelaziz Zewail, San Diego, CA (US); Tao Luo, San Diego, CA (US); Jing Sun, San Diego, CA (US); Xiaoxia Zhang, San Diego, CA (US); Peter Gaal, San Diego, CA (US); Juan Montojo, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 191 days.

(21) Appl. No.: 16/915,399

(22) Filed: Jun. 29, 2020

(65) Prior Publication Data

US 2021/0410118 A1 Dec. 30, 2021

(51) Int. Cl.
*H04W 72/04* (2009.01)
(52) U.S. Cl.
CPC ................................. *H04W 72/042* (2013.01)

(58) Field of Classification Search
CPC ............... H04J 11/0073; H04J 11/0069; H04J 11/0076; H04J 11/00; H04J 2011/0003
USPC ......................................................... 370/329
See application file for complete search history.

(56) References Cited

U.S. PATENT DOCUMENTS

| | | | |
|---|---|---|---|
| 2013/0223300 A1* | 8/2013 | Yang ..................... | H04L 1/1861 370/280 |
| 2017/0013643 A1* | 1/2017 | Nan ..................... | H04W 74/006 |
| 2017/0238287 A1* | 8/2017 | Kusashima ........... | H04W 28/04 370/280 |
| 2020/0083980 A1* | 3/2020 | Papasakellariou .... | H04W 52/34 |

* cited by examiner

*Primary Examiner* — Christopher M Crutchfield
*Assistant Examiner* — Jean F Voltaire
(74) *Attorney, Agent, or Firm* — Norton Rose Fulbright LLP

(57) ABSTRACT

This disclosure provides systems, methods, and apparatuses, including computer programs encoded on computer storage media, for wireless communication. In one aspect of the disclosure, a method of wireless communication performed by a user equipment (UE) includes receiving, from a base station, a scheduling downlink control information (DCI) message in a physical downlink control channel (PDCCH). The scheduling DCI message indicates a resource allocation for a scheduled DCI message in a subsequent physical downlink shared channel (PDSCH). The method further includes receiving, from the base station, the scheduled DCI message within the subsequent PDSCH. Other aspects and features are also claimed and described.

28 Claims, 8 Drawing Sheets

DOWNLINK CONTROL INFORMATION TRANSMISSION WITHIN A PHYSICAL DOWNLINK SHARED CHANNEL

TECHNICAL FIELD

Aspects of the present disclosure relate generally to wireless communication systems, and more particularly, to transmitting a downlink control message within a physical downlink shared channel.

DESCRIPTION OF THE RELATED TECHNOLOGY

Wireless communications systems are widely deployed to provide various types of communication content such as voice, video, packet data, messaging, broadcast, and so on. A wireless multiple-access communications system may include a number of base stations or network access nodes, each simultaneously supporting communication for multiple communication devices, which may be otherwise known as user equipment (UE). These systems may be capable of supporting communication with multiple UEs by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

5G NR communication systems may support wireless communications in higher frequency ranges than legacy wireless communication systems. For example, 5G NR communication systems may support wireless communications in the millimeter wave (mmWave) band. Such higher frequency communications may be performed with larger subcarrier spacing (SCS), and correspondingly, with a reduced orthogonal frequency division multiplexing (OFDM) symbol duration and a reduced slot duration. In 5G NR, a base station typically transmits a physical downlink control channel (PDCCH) in a control resource set (CORESET) to a UE in each slot to enable the UE to receive downlink control information (DCI) that is addressed to the UE. The UE may decode a DCI message to determine information, such as uplink or downlink assignments for the UE. Because of the reduction in slot duration at higher frequencies, UEs may monitor for PDCCHs and DCI messages more frequently at higher frequencies. However, because UEs typically perform blind decoding to receive and decode the DCI messages within the PDCCHs, the UEs may consume more power when operating at higher frequencies.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

One innovative aspect of the subject matter described in this disclosure can be implemented in a method of wireless communication performed by a user equipment (UE). The method includes receiving, from a base station, a scheduling downlink control information (DCI) message in a physical downlink control channel (PDCCH). The scheduling DCI message indicates a resource allocation for a scheduled DCI message in a subsequent physical downlink shared channel (PDSCH). The method further includes receiving, from the base station, the scheduled DCI message within the subsequent PDSCH.

Another innovative aspect of the subject matter described in this disclosure can be implemented in a UE. The UE includes at least one processor and a memory coupled with the at least one processor and storing processor-readable instructions that, when executed by the at least one processor, is configured to receive, from a base station, a scheduling DCI message in a PDCCH. The scheduling DCI message indicates a resource allocation for a scheduled DCI message in a subsequent PDSCH. The at least one processor is further configured to receive, from the base station, the scheduled DCI message within the subsequent PDSCH.

Another innovative aspect of the subject matter described in this disclosure can be implemented in an apparatus configured for wireless communication. The apparatus includes means for receiving, from a base station, a scheduling DCI message in a PDCCH. The scheduling DCI message indicates a resource allocation for a scheduled DCI message in a subsequent PDSCH. The apparatus further includes means for receiving, from the base station, the scheduled DCI message within the subsequent PDSCH.

Another innovative aspect of the subject matter described in this disclosure can be implemented in a non-transitory computer-readable medium storing instructions that, when executed by a processor, cause the processor to perform operations including receiving, from a base station, a scheduling DCI message in a PDCCH. The scheduling DCI message indicates a resource allocation for a scheduled DCI message in a subsequent PDSCH. The operations further include receiving, from the base station, the scheduled DCI message within the subsequent PDSCH.

Another innovative aspect of the subject matter described in this disclosure can be implemented in a method of wireless communication performed by a base station. The method includes transmitting, to a UE, a scheduling DCI message in a PDCCH. The scheduling DCI message indicates a resource allocation for a scheduled DCI message in a subsequent PDSCH. The method further includes transmitting, to the UE, the scheduled DCI message within the subsequent PDSCH.

Another innovative aspect of the subject matter described in this disclosure can be implemented in a base station. The base station includes at least one processor and a memory coupled with the at least one processor and storing processor-readable code that, when executed by the processor, is configured to initiate transmission, to a UE, of a scheduling DCI message in a PDCCH. The scheduling DCI message indicates a resource allocation for a scheduled DCI message in a subsequent PDSCH. The at least one processor is further configured to initiate transmission, to the UE, of the scheduled DCI message within the subsequent PDSCH.

Another innovative aspect of the subject matter described in this disclosure can be implemented in an apparatus configured for wireless communication. The apparatus includes means for transmitting, to a UE, a scheduling DCI message in a PDCCH. The scheduling DCI message indicates a resource allocation for a scheduled DCI message in a subsequent PDSCH. The apparatus further includes means for transmitting, to the UE, the scheduled DCI message within the subsequent PDSCH.

Another innovative aspect of the subject matter described in this disclosure can be implemented in a non-transitory computer-readable medium storing instructions that, when executed by a processor, cause the processor to perform operations including transmitting, to a UE, a scheduling DCI message in a PDCCH. The scheduling DCI message indicates a resource allocation for a scheduled DCI message in a subsequent PDSCH. The operations further include transmitting, to the UE, the scheduled DCI message within the subsequent PDSCH.

Other aspects, features, and implementations of the present disclosure will become apparent to a person having ordinary skill in the art, upon reviewing the following description of specific, example implementations of the present disclosure in conjunction with the accompanying figures. While features of the present disclosure may be described relative to particular implementations and figures below, all implementations of the present disclosure can include one or more of the advantageous features described herein. In other words, while one or more implementations may be described as having particular advantageous features, one or more of such features may also be used in accordance with the various implementations of the disclosure described herein. In similar fashion, while example implementations may be described below as device, system, or method implementations, such example implementations can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 9 is a flow diagram illustrating an example process that supports transmitting a DCI message within a PDSCH according to some aspects.

Like reference numbers and designations in the various drawings indicate like elements.

DETAILED DESCRIPTION

Figure 1:
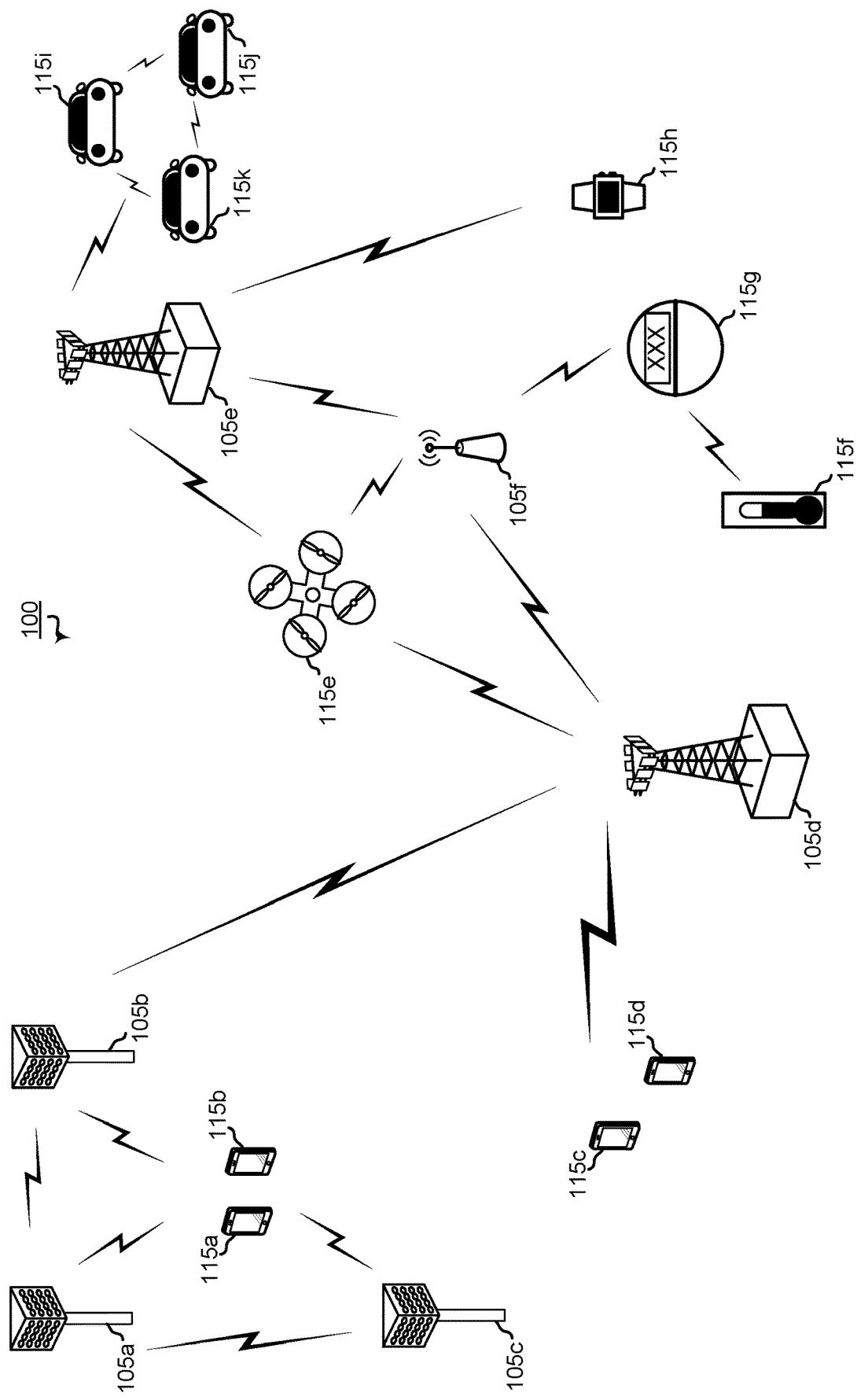
FIG. 1 is a block diagram illustrating details of an example wireless communication system.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

The electromagnetic spectrum is often subdivided, based on frequency/wavelength, into various classes, bands, channels, etc. In fifth generation (5G) new radio (NR), two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band/spectrum in documents and articles, despite being different than the extremely high frequency (EHF) band (30 GHz-300 GHz) which is identified by the International Telecommunications Union (ITU) as a "millimeter wave" band. With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The present disclosure provides systems, apparatus, methods, and computer-readable media that support transmission of downlink control information (DCI) messages within a physical downlink shared channel (PDSCH). As used herein, a DCI message transmitted or received within a PDSCH may be referred to as a "piggyback DCI" or a "piggyback DCI message." Transmitting a DCI message within a PDSCH, instead of in a physical downlink control channel (PDCCH), may reduce power consumption at a user equipment (UE).

To illustrate, a base station may transmit a scheduling DCI message in a PDCCH to a UE. The scheduling DCI message indicates a resource allocation for a scheduled DCI message in a subsequent PDSCH. For example, the scheduling DCI message may indicate time resources, frequency resources, or both, that are allocated to a scheduled DCI message within the subsequent PDSCH. The resources allocated to the scheduled DCI message may be a subset of the resources allocated to the subsequent PDSCH. The base station may also transmit the scheduled DCI message to the UE within the subsequent PDSCH according to the allocated resources. The scheduled DCI message may include or correspond to a single DCI message or, alternatively, may include multiple individual DCI messages.

In some implementations, the scheduled DCI message includes a header followed by one or more individual DCI messages. The header may include information associated with the individual DCI messages, such as a number of individual DCI messages included in the scheduled DCI message or DCI types associated with the individual DCI messages. Including such information in the header may enable a reduction in size of the individual DCI messages, such as due to omission of a particular bit or field that indicates whether the associated individual DCI message is for uplink (UL) or downlink (DL) communications. Additionally or alternatively, because the individual DCI messages are transmitted within the PDSCH, the individual DCI messages are not blind decoded by the UE, and thus the individual DCI messages may be transmitted without padding bits or truncation that would otherwise be used to reduce complexity of the blind decoding at the UE. In some implementations, transmission of DCI messages within a PDSCH supports one or more new types of DCI messages that are not configured for transmission within a PDCCH, as further described herein.

Particular implementations of the subject matter described in this disclosure can be implemented to realize one or more of the following potential advantages. In some aspects, the present disclosure supports transmission of a DCI message within a PDSCH. Because a resource allocation associated with the DCI message is included in a scheduling DCI message that is received by a UE, and because DCI types of individual DCI messages are indicated by DCI type fields, the UE does not need to perform blind decoding to receive and decode the DCI message within the PDSCH. Reducing the amount of blind decoding performed by the UE may reduce power consumption at the UE. Additionally or alternatively, by including multiple individual DCI messages within the DCI message transmitted within the PDSCH, the multiple individual DCI messages may be communicated to the UE without including padding bits or truncating the individual DCI messages, which may otherwise be used to reduce the complexity associated with blind decoding the individual DCI messages at the UE. Additionally, transmitting multiple individual DCI messages within a PDSCH may reduce PDCCH monitoring occasions for UEs, which may reduce power consumption at the UEs even in view of the reduced slot durations associated with the mmWave band or other higher frequencies. Additionally or alternatively, types of DCI messages that are not designated for transmission within PDCCHs may be transmitted within PDSCHs, thereby supporting transmission of additional information, such as information for other UEs to be communicated over a sidelink, in DCI messages transmitted within PDSCHs in FR1, FR2, or higher frequencies.

This disclosure relates generally to providing or participating in authorized shared access between two or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM or GSM EDGE, together with the network that joins the base stations (for example, the Ater and Abis interfaces, among other examples) and the base station controllers (for example, A interfaces, among other examples). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may include one or more GERANs, which may be coupled with UTRANs in the case of a UMTS or GSM network. Additionally, an operator network may include one or more LTE networks, or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named the "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, 5G, or NR technologies; however, the description is not intended to be limited to a specific technology or application, and one or more aspects described with reference to one technology may be understood to be applicable to another technology. Indeed, one or more aspects the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (such as ~1 M nodes per km2), ultra-low complexity (such as ~10s of bits per sec), ultra-low energy (such as ~10+ years of battery life), and deep coverage with the capability to reach challenging locations; (2) including mission-critical control with strong security to safeguard sensitive personal, financial, or classified information, ultra-high reliability (such as ~99.9999% reliability), ultra-low latency (such as ~1 millisecond (ms)), and users with wide ranges of mobility or lack thereof; and (3) with enhanced mobile broadband including extreme high capacity (such as ~10 Tbps per km2), extreme data rates (such as multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) or frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80 or 100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

FIG. 1 is a block diagram illustrating details of an example wireless communication system. The wireless communication system may include wireless network 100. The wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements, such as device-to-device, peer-to-peer or ad hoc network arrangements, among other examples.

The wireless network 100 illustrated in FIG. 1 includes a number of base stations 105 and other network entities. A base station may be a station that communicates with the UEs and may be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station or a base station subsystem serving the coverage area, depending on the context in which the term is used. In implementations of the wireless network 100 herein, the base stations 105 may be associated with a same operator or different operators, such as the wireless network 100 may include a plurality of operator wireless networks. Additionally, in implementations of the wireless network 100 herein, the base stations 105 may provide wireless communications using one or more of the same frequencies, such as one or more frequency bands in licensed spectrum, unlicensed spectrum, or a combination thereof, as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area, such as several kilometers in radius, and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area, such as a home, and, in addition to unrestricted access, may provide restricted access by UEs having an association with the femto cell, such as UEs in a closed subscriber group (CSG), UEs for users in the home, and the like. A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple cells, such as two cells, three cells, four cells, and the like.

The wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

The UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may include implementations of one or more of the UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, a gesture tracking device, a medical device, a digital audio player (such as MP3 player), a camera or a game console, among other examples; and digital home or smart home devices such as a home audio, video, and multimedia device, an appliance, a sensor, a vending machine, intelligent lighting, a home security system, or a smart meter, among other examples. In one aspect, a UE may be a device that includes a Universal Integrated Circuit Card (UICC). In another aspect, a UE may be a device that does not include a UICC. In some aspects, UEs that do not include UICCs may be referred to as IoE devices. The UEs 115a-115d of the implementation illustrated in FIG. 1 are examples of mobile smart phone-type devices accessing the wireless network 100. A UE may be a machine specifically configured for connected communication, including machine type communication (MTC), enhanced MTC (eMTC), narrowband IoT (NB-IoT) and the like. The UEs 115e-115k illustrated in FIG. 1 are examples of various machines configured for communication that access 5G network 100.

A mobile apparatus, such as the UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. Backhaul communication between base stations of the wireless network 100 may occur using wired or wireless communication links.

In operation at the 5G network 100, the base stations 105a-105c serve the UEs 115a and 115b using 3D beamforming and coordinated spatial techniques, such as coordinated multipoint (CoMP) or multi-connectivity. Macro base station 105d performs backhaul communications with the base stations 105a-105c, as well as small cell, the base station 105f. Macro base station 105d also transmits multicast services which are subscribed to and received by the UEs 115c and 115d. Such multicast services may include mobile television or stream video, or may include other services for providing community information, such as weather emergencies or alerts, such as Amber alerts or gray alerts.

The wireless network 100 of implementations supports mission critical communications with ultra-reliable and redundant links for mission critical devices, such the UE 115e, which is a drone. Redundant communication links with the UE 115e include from the macro base stations 105d and 105e, as well as small cell base station 105f. Other machine type devices, such as UE 115f (thermometer), the UE 115g (smart meter), and the UE 115h (wearable device) may communicate through the wireless network 100 either directly with base stations, such as the small cell base station 105f, and the macro base station 105e, or in multi-hop configurations by communicating with another user device which relays its information to the network, such as the UE 115f communicating temperature measurement information to the smart meter, the UE 115g, which is then reported to the network through the small cell base station 105f. The 5G network 100 may provide additional network efficiency through dynamic, low-latency TDD or FDD communications, such as in a vehicle-to-vehicle (V2V) mesh network between the UEs 115i-115k communicating with the macro base station 105e.

Figure 2:
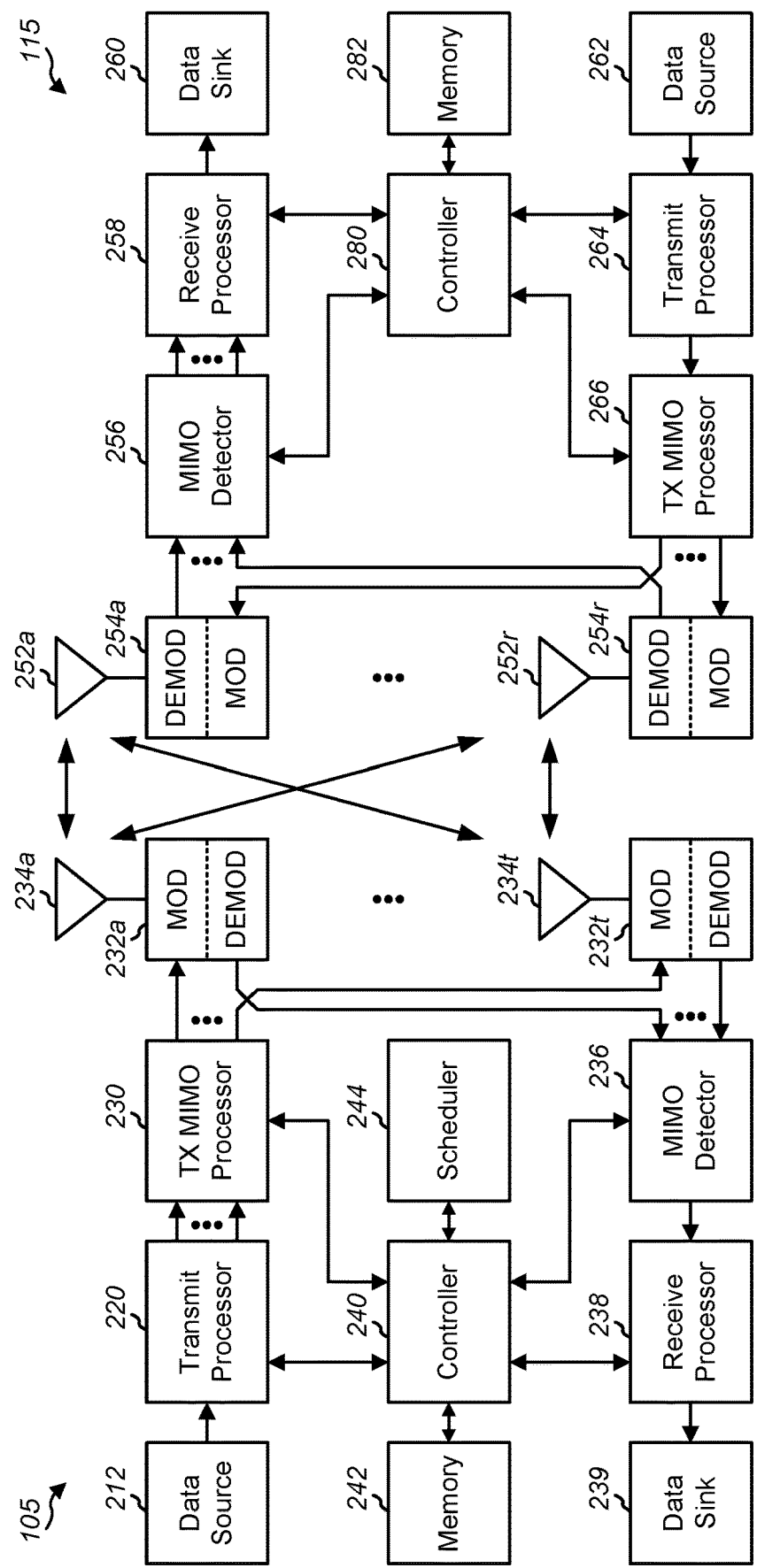
FIG. 2 is a block diagram conceptually illustrating an example design of a base station and a user equipment (UE).

FIG. 2 is a block diagram conceptually illustrating an example design of a base station 105 and a UE 115. The base station 105 and the UE 115 may be one of the base stations and one of the UEs in FIG. 1. For a restricted association scenario (as mentioned above), the base station 105 may be the small cell base station 105f in FIG. 1, and the UE 115 may be the UE 115c or 115d operating in a service area of the base station 105f, which in order to access the small cell base station 105f, would be included in a list of accessible UEs for the small cell base station 105f. Additionally, the base station 105 may be a base station of some other type. As shown in FIG. 2, the base station 105 may be equipped with antennas 234a through 234t, and the UE 115 may be equipped with antennas 252a through 252r for facilitating wireless communications.

At the base station 105, a transmit processor 220 may receive data from a data source 212 and control information from a controller 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), or MTC physical downlink control channel (MPDCCH), among other examples. The data may be for the PDSCH, among other examples. The transmit processor 220 may process, such as encode and symbol map, the data and control information to obtain data symbols and control symbols, respectively. Additionally, the transmit processor 220 may generate reference symbols, such as for the primary synchronization signal (PSS) and secondary synchronization signal (SSS), and cell-specific reference signal. Transmit (TX) multiple-input multiple-output (MIMO) processor 230 may perform spatial processing on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream, such as for OFDM, among other examples, to obtain an output sample stream. Each modulator 232 may additionally or alternatively process the output sample stream to obtain a downlink signal. For example, to process the output sample stream, each modulator 232 may convert to analog, amplify, filter, and upconvert the output sample stream to obtain the downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition a respective received signal to obtain input samples. For example, to condition the respective received signal, each demodulator 254 may filter, amplify, downconvert, and digitize the respective received signal to obtain the input samples. Each demodulator 254 may further process the input samples, such as for OFDM, among other examples, to obtain received symbols. MIMO detector 256 may obtain received symbols from demodulators 254a through 254r, perform MIMO detection on the received symbols if applicable, and provide detected symbols. Receive processor 258 may process the detected symbols, provide decoded data for the UE 115 to a data sink 260, and provide decoded control information to a controller 280. For example, to process the detected symbols, the receive processor 258 may demodulate, deinterleave, and decode the detected symbols.

On the uplink, at the UE 115, a transmit processor 264 may receive and process data (such as for the physical uplink shared channel (PUSCH)) from a data source 262 and control information (such as for the physical uplink control channel (PUCCH)) from the controller 280. Additionally, the transmit processor 264 may generate reference symbols for a reference signal. The symbols from the transmit processor 264 may be precoded by TX MIMO processor 266 if applicable, further processed by the modulators 254a through 254r (such as for SC-FDM, among other examples), and transmitted to the base station 105. At base station 105, the uplink signals from the UE 115 may be received by antennas 234, processed by demodulators 232, detected by MIMO detector 236 if applicable, and further processed by receive processor 238 to obtain decoded data and control information sent by the UE 115. The receive processor 238 may provide the decoded data to data sink 239 and the decoded control information to the controller 240.

The controllers 240 and 280 may direct the operation at the base station 105 and the UE 115, respectively. The controller 240 or other processors and modules at the base station 105 or the controller 280 or other processors and modules at the UE 115 may perform or direct the execution of various processes for the techniques described herein, such as to perform or direct the execution illustrated in FIGS. 7 and 9, or other processes for the techniques described herein. The memories 242 and 282 may store data and program codes for the base station 105 and The UE 115, respectively. Scheduler 244 may schedule UEs for data transmission on the downlink or uplink.

In some cases, the UE 115 and the base station 105 may operate in a shared radio frequency spectrum band, which may include licensed or unlicensed, such as contention-based, frequency spectrum. In an unlicensed frequency portion of the shared radio frequency spectrum band, the UEs 115 or the base stations 105 may traditionally perform a medium-sensing procedure to contend for access to the frequency spectrum. For example, the UE 115 or base station 105 may perform a listen-before-talk or listen-before-transmitting (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. In some implementations, a CCA may include detection of specific sequences that indicate use of the channel. For example, another device may transmit a specific preamble prior to transmitting a data sequence. In some cases, an LBT procedure may include a wireless node adjusting its own back off window based on the amount of energy detected on a channel or the acknowledge or negative-acknowledge (ACK or NACK) feedback for its own transmitted packets as a proxy for collisions.

The present disclosure provides systems, apparatus, methods, and computer-readable media that support transmission of downlink control information (DCI) messages within a PDSCH. As used herein, a DCI message transmitted or received within a PDSCH may be referred to as a "piggyback DCI" or a "piggyback DCI message." Transmitting a DCI message within a PDSCH, instead of within a PDCCH, may reduce power consumption at a user equipment (UE).

To illustrate, a base station may transmit a scheduling DCI message in a PDCCH to a UE. The scheduling DCI message indicates a resource allocation for a scheduled DCI message in a subsequent PDSCH. For example, the scheduling DCI message may indicate time resources, frequency resources, or both, that are allocated to a scheduled DCI message within the subsequent PDSCH. The resources allocated to the scheduled DCI message may be a subset of the resources allocated to the subsequent PDSCH. The base station may also transmit the scheduled DCI message to the UE within the subsequent PDSCH according to the allocated resources. The scheduled DCI message may include or correspond to a single DCI message or, alternatively, may include multiple individual DCI messages.

In some implementations, the scheduled DCI message includes a header followed by one or more individual DCI messages. The header may include information associated with the individual DCI messages, such as a number of individual DCI messages included in the scheduled DCI message or DCI types associated with the individual DCI messages. Including such information in the header may enable a reduction in size of the individual DCI messages, such as due to omission of a particular bit or field that indicates whether the associated individual DCI message is for UL or DL communications. Additionally or alternatively, because the individual DCI messages are transmitted within the PDSCH, the individual DCI messages are not blind decoded by the UE, and thus the individual DCI messages may be transmitted without padding bits or truncation that would otherwise be used to reduce complexity of the blind decoding at the UE. In some implementations, transmission of DCI messages within a PDSCH supports one or more new types of DCI messages that are not configured for transmission within a PDCCH, as further described herein.

Particular implementations of the subject matter described in this disclosure can be implemented to realize one or more of the following potential advantages. In some aspects, the present disclosure supports transmission of a DCI message within a PDSCH. Because a resource allocation associated with the DCI message is included in a scheduling DCI message that is received by a UE, and because DCI types of individual DCI messages are indicated by DCI type fields, the UE does not need to perform blind decoding to receive and decode the DCI message within the PDSCH. Reducing the amount of blind decoding performed by the UE may reduce power consumption at the UE. Additionally or alternatively, by including multiple individual DCI messages within the DCI message transmitted within the PDSCH, the multiple individual DCI messages may be communicated to the UE without including padding bits or truncating the individual DCI messages, which may otherwise be used to reduce the complexity associated with blind decoding the individual DCI messages at the UE. Additionally, transmitting multiple individual DCI messages within a PDSCH may reduce PDCCH monitoring occasions for UEs, which may reduce power consumption at the UEs even in view of the reduced slot durations associated with the mmWave band or other higher frequencies. Additionally or alternatively, types of DCI messages that are not designated for transmission within PDCCHs may be transmitted within PDSCHs, thereby supporting transmission of additional information, such as information for other UEs to be communicated over a sidelink, in DCI messages transmitted within PDSCHs in FR1, FR2, or higher frequencies.

Figure 3:
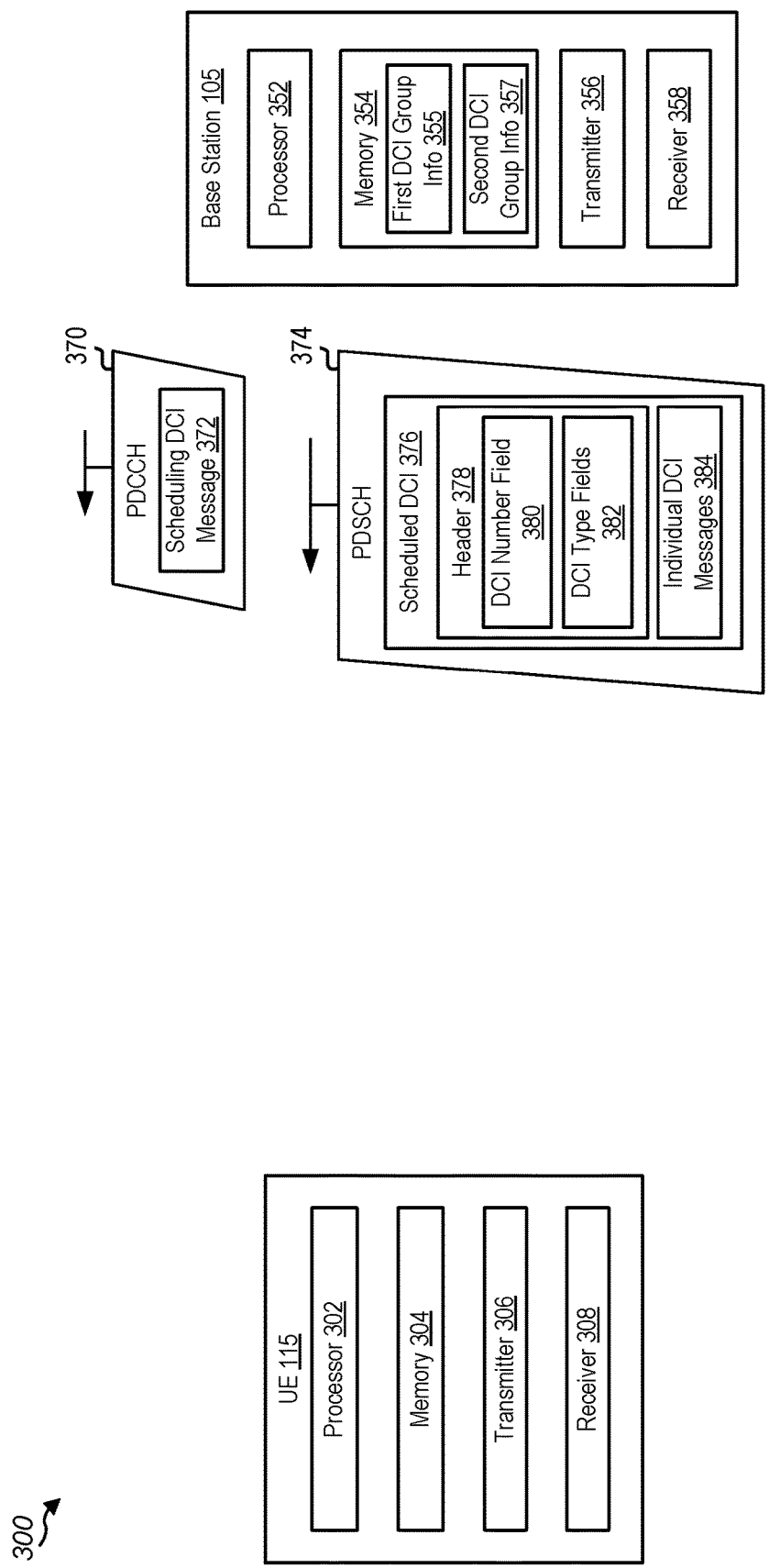
FIG. 3 is a block diagram illustrating an example wireless communication system that supports transmitting a downlink control information (DCI) message within a physical downlink shared channel (PDSCH) according to some aspects of the present disclosure.

FIG. 3 is a block diagram of an example wireless communications system 300 that supports transmitting a DCI message within a PDSCH according to some aspects of the present disclosure. In some examples, the wireless communications system 300 may implement aspects of the wireless network 100. The wireless communications system 300 includes the UE 115 and the base station 105. Although one UE 115 and one base station 105 are illustrated, in some other implementations, the wireless communications system 300 may generally include multiple UEs 115, and may include more than one base station 105.

The UE 115 can include a variety of components (such as structural, hardware components) used for carrying out one or more functions described herein. For example, these components can include one or more processors 302 (hereinafter referred to collectively as "the processor 302"), one or more memory devices 304 (hereinafter referred to collectively as "the memory 304"), one or more transmitters 306 (hereinafter referred to collectively as "the transmitter 306"), and one or more receivers 308 (hereinafter referred to collectively as "the receiver 308"). The processor 302 may be configured to execute instructions stored in the memory 304 to perform the operations described herein. In some implementations, the processor 302 includes or corresponds to one or more of the receive processor 258, the transmit processor 264 and the controller 280, and the memory 304 includes or corresponds to the memory 282.

The transmitter 306 is configured to transmit reference signals, control information and data to one or more other devices, and the receiver 308 is configured to receive references signals, synchronization signals, control information and data from one or more other devices. For example, the transmitter 306 may transmit signaling, control information and data to, and the receiver 308 may receive signaling, control information and data from, the base station 105. In some implementations, the transmitter 306 and the receiver 308 may be integrated in one or more transceivers. Additionally or alternatively, the transmitter 306 or the receiver 308 may include or correspond to one or more components of the UE 115 described with reference to FIG. 2.

The base station 105 can include a variety of components (such as structural, hardware components) used for carrying out one or more functions described herein. For example, these components can include one or more processors 352 (hereinafter referred to collectively as "the processor 352"), one or more memory devices 354 (hereinafter referred to collectively as "the memory 354"), one or more transmitters 356 (hereinafter referred to collectively as "the transmitter 356"), and one or more receivers 358 (hereinafter referred to collectively as "the receiver 358"). The processor 352 may be configured to execute instructions stored in the memory 354 to perform the operations described herein. In some implementations, the processor 352 includes or corresponds to one or more of the receive processor 238, the transmit processor 220 and the controller 240, and the memory 354 includes or corresponds to the memory 242.

In some implementations, memory 354 may be configured to store first DCI group information 355 and second DCI group information 357. The first DCI group information 355 may indicate DCI types that are included in a first DCI group, such as a group of DCI types defined for inclusion within PDCCHs. The second DCI group information 357 may indicate DCI types that are included in a second DCI group, such as a group of DCI types defined for inclusion in PDSCHs.

The transmitter 356 is configured to transmit reference signals, synchronization signals, control information and data to one or more other devices, and the receiver 358 is configured to receive reference signals, control information and data from one or more other devices. For example, the transmitter 356 may transmit signaling, control information and data to, and the receiver 358 may receive signaling, control information and data from, the UE 115. In some implementations, the transmitter 356 and the receiver 358 may be integrated in one or more transceivers. Additionally or alternatively, the transmitter 356 or the receiver 358 may include or correspond to one or more components of base station 105 described with reference to FIG. 2.

In some implementations, the wireless communications system 300 implements a 5G New Radio (NR) network. For example, the wireless communications system 300 may include multiple 5G-capable UEs 115 and multiple 5G-capable base stations 105, such as UEs and base stations configured to operate in accordance with a 5G NR network protocol such as that defined by the 3GPP. In some implementations, the wireless communications system 300 is configured to support wireless communications, such as between the UE 115 and the base station 105, in the mmWave band or other high frequencies. Such communications may be associated with larger subcarrier spacing (SCS), decreased OFDM symbol duration, and decreased slot duration as compared to communications in the Sub-6 GHz band.

During operation of the wireless communications system 300, the base station 105 may generate a scheduling DCI message 372 for transmission to the UE 115. The scheduling DCI message 372 may indicate a resource allocation for a scheduled DCI message 376, also referred to as a "piggyback DCI" or a "piggyback DCI message," in a subsequent PDSCH 374. For example, the scheduling DCI message 372 may indicate time resources, frequency resources, or both, allocated to the scheduled DCI message 376. The resource allocation indicated by the scheduling DCI message 372 may be a subset of resources allocated to the PDSCH 374. A resource allocation for the PDSCH 374 may also be indicated in the scheduling DCI message 372 or in another message to the UE 115. In some implementations, the resource allocation indicated by the scheduling DCI message 372 includes a contiguous group of resources, such as multiple contiguous symbols. In some other implementations, the resource allocation indicated by the scheduling DCI message 372 may include multiple noncontiguous groups of resources, such as multiple noncontiguous symbols, within the resources allocated to the PDSCH 374. The scheduling DCI message 372 may also indicate a size of the scheduled DCI message 376.

The base station 105 may transmit the scheduling DCI message 372 in a PDCCH 370 to the UE 115. The PDCCH 370 may be transmitted within a control resource set (CORESET) that refers to time resources and frequency resources in which PDCCHs are transmitted. The UE 115 may receive the scheduling DCI message 372 in the PDCCH 370, and the UE 115 may identify resources to monitor for the scheduled DCI message 376 based on the resource allocation indicated by the scheduling DCI message 372. Additionally, the UE 115 may identify resources to monitor for the PDSCH 374 based on the resource allocation indicated by the scheduling DCI message 372 or by another message received in the PDCCH 370.

Although described above for a PDSCH having dynamic scheduling, such as where each PDSCH is scheduled by a corresponding DCI message, the above-described techniques may also be applied to a PDSCH having semi persistent scheduling (SPS), such as where a PDSCH is scheduled by radio resource control (RRC) messages. For example, an RRC message that schedules SPS of a PDSCH may also indicate a resource allocation for a DCI message within the PDSCH. Although the scheduling of the PDSCH is static, the number of individual DCI messages included in a scheduled DCI message may be dynamic and may be changed by a later RRC message.

The base station 105 may also generate the scheduled DCI message 376 for transmission to the UE 115. In some implementations, the scheduled DCI message 376 is addressed to, or contains information for, the UE 115. In some other implementations, the scheduled DCI message 376 is addressed to, or contains information for, multiple UEs including the UE 115. In some such implementations, the scheduled DCI message 376 may be transmitted within multiple PDSCHs, may be transmitted within a group channel, may be broadcast, or otherwise communicated to the multiple UEs.

In some implementations, the scheduled DCI message 376 includes or corresponds to a single DCI message. Alternatively, the scheduled DCI message 376 may include multiple individual DCI messages, which may also be referred to as "component DCIs" or "component DCI messages." At least some of the multiple individual DCI messages may be different types of DCI messages than others of the multiple individual DCI messages, as further described herein.

The scheduled DCI message 376 may include a header 378 and one or more individual DCI messages (referred to herein as "individual DCI messages 384"). The header 378 may be located prior to the individual DCI messages 384 within the scheduled DCI message 376. Stated differently, the individual DCI messages 384 may be located subsequent to the header 378 in the scheduled DCI message 376. The header 378 includes information associated with the individual DCI messages 384. For example, the header 378 may include a DCI number field 380, one or more DCI type fields (referred to herein as "DCI type fields 382"), other fields or bits, or a combination thereof. The DCI number field 380 may indicate the number or quantity of the individual DCI messages 384 included in the scheduled DCI message 376.

The DCI type fields 382 may be configured to indicate DCI types, also referred to as DCI formats, associated with the individual DCI messages 384. In some implementations, the DCI type fields 382 include a respective DCI type field associated with each of the individual DCI messages 384. As a particular example, the DCI type fields 382 may include a first DCI type field and a second DCI type field, the individual DCI messages 384 may include a first individual DCI message and a second individual DCI message, the first DCI type field may indicate a DCI type associated with the first individual DCI message, and the second DCI type field may indicate a DCI type associated with the second individual DCI message. Although described as including two individual DCI messages, in other examples, the scheduled DCI message 376 may include a single DCI message or more than two individual DCI messages (with more than two respective DCI type fields included in the header 378). In some implementations, each of the individual DCI messages 384 is associated with a different DCI type. Alternatively, two or more of the individual DCI messages 384 may be associated with the same DCI type. In some implementations, sizes of the individual DCI messages 384 are based on the respective DCI types and higher-layer configurations associated with the associated DCI types. In some such implementations, the higher-layer configurations are stored at or available to the base station 105 and the UE 115, and thus size fields for the individual DCI messages 384 may not be included in the header 378.

In some implementations, the DCI types associated with individual DCI messages permitted to be included in the scheduled DCI message 376 may be limited. As a non-limiting example, the base station 105 may be configured to include DCI messages for UL assignments or grants or for DL assignments or grants in the scheduled DCI message 376 and not to include DCI messages associated with other DCI types. Alternatively, any type of individual DCI message may be included in the scheduled DCI message 376. For example, individual DCI messages associated with any DCI type or DCI format defined in 5G NR wireless communication standard specifications, such as a 3GPP wireless communication standard specification, may be included by the base station 105 in the scheduled DCI message 376.

In some implementations, the base station 105 may be configured to select individual DCI messages associated with a first DCI group indicated by the first DCI group information 355 for inclusion in the scheduled DCI message 376. For example, the first DCI group information 355 may indicate DCI types included in a first DCI group that is defined, such as in a 5G NR wireless communication standard specification, for inclusion within PDCCHs. Alternatively, the base station 105 may be configured to select individual DCI messages associated with DCI types included in a subset of the first DCI group. The subset may be defined according to any parameters, such as a subset that includes only DL grants or UL grants, as a non-limiting example.

In some other implementations, the base station 105 may be configured to select individual DCI messages associated with a second DCI group indicated by the second DCI group information 357 for inclusion in the scheduled DCI message 376. For example, the second DCI group information 357 may indicate DCI types included in a second DCI group that is defined for inclusion within PDSCHs. The second DCI group may include one or more "new" DCI types that are different than the DCI types included in the first DCI group. In some implementations, the second DCI group may include one or more DCI types that are also included in the first DCI group, such that one or more DCI types are defined for inclusion in PDCCHs and in PDSCHs. Alternatively, no DCI type included in the second DCI group may be included in the first DCI group, such that DCI types for inclusion in DCI messages within PDSCHs are different than DCI types for inclusion within PDCCHs.

In some implementations in which the second DCI group includes one or more additional DCI types not included in the first DCI group, the DCI type fields 382 have a different size than DCI type fields used to indicate DCI types from only the first DCI group. For example, a number of bits used to represent each of the DCI type fields 382 may be increased as compared to the size of DCI type fields in a DCI message that only supports DCI types from the first DCI group. As a non-limiting example, DCI type fields indicating DCI types included in the first DCI group may include two or three bits, and DCI type fields indicating DCI types included in the second DCI group may include four or more bits. Using additional bits in the DCI type fields 382 enables the DCI type fields 382 to indicate each DCI type included in the first DCI group and each DCI type included in the second DCI group. Although DCI type fields having different sizes are described, it should be noted that each DCI type field within a particular DCI message has the same size, regardless of whether the size is an original size associated with DCI types from the first DCI group or an increased size associated with DCI types from the second group. Alternatively, if only a subset of the first DCI group is designated for inclusion in PDSCHs, the DCI type fields 382 may each include fewer bits than DCI type fields indicating DCI types included in the first DCI group.

In some implementations, the second DCI group includes a group-common DCI type, and at least one individual DCI message of the individual DCI messages 384 may be associated with the group-common DCI type. A group-common DCI type may be associated with a DCI message that indicates information for multiple UEs instead of being specific to a single UE. In some such implementations, even though the at least one individual DCI message is associated with the group-common DCI type, the at least one individual DCI message may include information for only a single UE, such as the UE 115. In such implementations, the at least one individual DCI message associated with the group-common DCI type may be reduced in scope to include information for only the UE to which the PDSCH including the at least one individual DCI message is transmitted. Additionally or alternatively, at least one individual DCI message of the individual DCI messages 384 may include information designated to be relayed by the UE 115 to one or more other UEs via sidelink (SL) communications. For example, the at least one individual DCI message may include information for the UE 115 to transmit to another UE on the SL to provide coverage enhancement, or other functions.

In some implementations, one or more of the individual DCI messages 384 may have a different size than a DCI message that would be transmitted within a PDCCH. For example, the base station 105 may omit a particular bit from at least one individual DCI message included in the scheduled DCI message 376. The particular bit may be included in at least some types of DCI messages and may be configured to indicate whether the at least one individual DCI message is associated with UL communications or DL communications, as further described with reference to FIG. 5. Additionally or alternatively, the base station 105 may omit one or more padding bits from at least one individual DCI message, refrain from truncating at least one individual DCI message, or a combination thereof, as further described with reference to FIG. 5. Due to the omission of the particular bit, the omission of the padding bits, or the lack of truncation, one or more of the individual DCI messages 384 may have a different size than a DCI message that includes the same information and that would be transmitted to the UE 115 within a PDCCH.

In some implementations, the base station 105 may select the individual DCI messages 384 for inclusion in the scheduled DCI message 376 based on the resource allocation indicated by the scheduling DCI message 372, a modulation order associated with the scheduled DCI message 376, a code rate associated with the scheduled DCI message 376, a reliability requirement associated with the scheduled DCI message 376, other parameters, or a combination thereof. To illustrate, the number of individual DCI messages selected by the base station 105 sets the total size of the scheduled DCI message 376, and the total size may be constrained based on the resource allocation, the modulation order, the code rate, the reliability requirement, the other parameters, or a combination thereof.

In some implementations, the base station 105 may determine whether to add one or more padding bits to the scheduled DCI message 376 based on a comparison of the size indicated by scheduling DCI message 372 and a total size of the header 378 and the individual DCI messages 384. To illustrate, the size indicated by the scheduling DCI message 372 may be an estimated size that is calculated by the base station 105 prior to selecting the individual DCI messages 384 and generating the entirety of the scheduled DCI message 376. After generating the header 378 and selecting the individual DCI messages 384, the base station 105 may compare the total size of the header 378 and the individual DCI messages 384 to the size indicated by the scheduling DCI message 372. If the total size is less than the size indicated in the scheduling DCI message 372, the base station 105 may include one or more padding bits in the scheduled DCI message 376 subsequent to the individual DCI messages 384 to cause the total size of the scheduled DCI message 376 to match the size indicated by the scheduling DCI message 372.

After generating the scheduled DCI message 376, the base station 105 may transmit the scheduled DCI message 376 within the PDSCH 374 to the UE 115. The UE 115 may receive the scheduled DCI message 376 within the PDSCH 374 without performing blind decoding. For example, the UE 115 may monitor for the scheduled DCI message 376 at the resources designated in the resource allocation indicated in the scheduling DCI message 372. After receiving the scheduled DCI message 376, the UE 115 may process the scheduled DCI message 376. Processing the scheduled DCI message 376 may include determining information associated with the individual DCI messages 384 based on the header 378. For example, the UE 115 may determine a number of the individual DCI messages 384 included in the scheduled DCI message 376 based on the DCI number field 380. As another example, the UE 115 may determine one or more DCI types associated with the individual DCI messages 384 based on the DCI type fields 382. To illustrate, determining the DCI types may include determining a first DCI type associated with a first individual DCI message of the individual DCI messages 384 based on a first DCI type field of the DCI type fields 382 and determining a second DCI type associated with a second individual DCI message of the individual DCI messages 384 based on a second DCI type field of the DCI type fields 382. The first DCI type may be different than the second DCI type, or alternatively, may be the same as the second DCI type. In other examples, more than two DCI types may be determined in a similar manner.

In some implementations, the header 378 does not include sizes of the individual DCI messages 384. Instead, the sizes are determined by the UE 115. For example, the UE 115 may determine the sizes of the individual DCI messages 384 based on the DCI types indicated by the DCI type fields 382 and higher-layer configurations associated with the DCI types. The higher-layer configurations may be stored at or accessible to the UE 115 and may indicate sizes of DCI messages having various DCI types. The UE 115 may process the individual DCI messages 384 based at least in part on the sizes. Processing or decoding the individual DCI message 384 based on a size of each individual DCI message may be faster, less complex, and require less power consumption than blind decoding the individual DCI messages 384 using one or more size hypotheses.

After decoding the scheduled DCI message 376, the UE 115 may perform one or more operations based on the scheduled DCI message 376. For example, the UE 115 may transmit a message to the base station 105. As another example, the UE 115 may monitor for a message from the base station 105. As another example, the UE 115 may transmit a message to another UE.

As described with reference to FIG. 3, the present disclosure provides techniques for enabling transmission of a DCI message within a PDSCH, instead of transmission of the DCI message within a PDCCH. For example, the base station 105 may transmit the scheduling DCI message 372 within the PDCCH 370 and transmit the scheduled DCI message 376 within the PDSCH 374. Because the scheduling DCI message 372 includes a resource allocation associated with the scheduled DCI message 376 and not the information of the scheduled DCI message 376, the amount of PDCCH monitoring is reduced. Additionally, because the scheduled DCI message 376 includes the DCI type fields 382, the UE 115 is able to determine sizes of the individual DCI messages 384, and blind decoding performed by the UE 115 is reduced. Reducing the amount of blind decoding may reduce complexity of a decoding process for the scheduled DCI message 376 and reduce power consumption at the UE 115. Additionally, because multiple individual DCI messages may be included in the scheduled DCI message 376, fewer messages may be transmitted within PDCCHs, which may reduce a number of PDCCH monitoring occasions for the UE 115. Reducing the number of PDCCH monitoring occasions may enable the wireless communications system 300 to support communications in higher frequencies, such as the mmWave band, without increasing power consumption at the UE 115 due to increased DCI messages based on the reduced slot duration associated with the mmWave band and other higher frequencies. Additionally or alternatively, types of DCI messages that are not transmitted within PDCCHs may be included in the scheduled DCI message 376, thereby supporting transmission of additional information, such as information for other UEs to be communicated over a sidelink by the UE 115, regardless of whether the wireless communications system 300 supports wireless communications in FR1, FR2, or higher frequencies.

Figure 4:
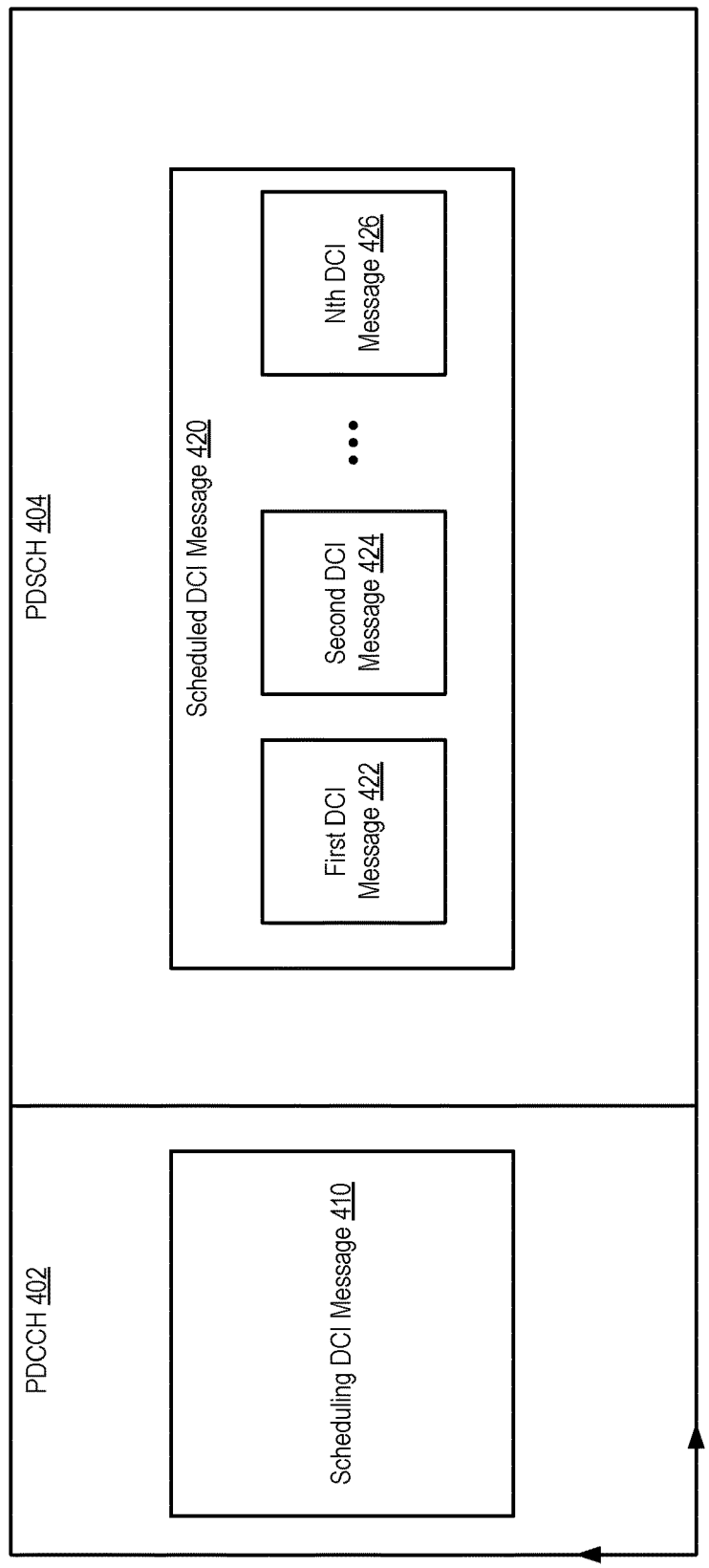
FIG. 4 is a diagram of resources allocated to downlink communications according to some aspects.

FIG. 4 is a diagram of resources 400 allocated to downlink communications according to some aspects. In some implementations, the downlink communications may be performed by a base station to a UE, such as by the base station 105 to the UE 115 of FIG. 3. In FIG. 4, the horizontal axis represents time and the vertical axis represents frequency. The resources 400 may be allocated to a PDCCH 402 and a PDSCH 404. The PDCCH 402 and the PDSCH 404 may be allocated to different resources, such as different time resources, different frequency resources, or a combination thereof, such that the PDCCH 402 is independent from the PDSCH 404. The resources allocated to the PDCCH 402, or to multiple PDCCHs including the PDCCH 402, may be included in or correspond to a CORESET. The PDSCH 404 may be referred to as a subsequent PDSCH or a subsequent communication and may be allocated to time resources subsequent to the time resources to which the PDCCH 402 is allocated.

The PDCCH 402 may include a scheduling DCI message 410 that includes a resource allocation indicating resources, such as time resources, frequency resources, or a combination thereof, within the PDSCH 404 that are allocated for transmission of a scheduled DCI message 420. In some implementations, the scheduling DCI message 410 may also indicate a resource allocation for the PDSCH 404, or the resource allocation for the PDSCH 404 may be indicated by another message within the PDCCH 402. Typically, DCI messages may be transmitted within the PDCCH 402. However, according to at least some aspects of the present disclosure, the scheduling DCI message 410 may be transmitted within the PDCCH 402 and the scheduled DCI message 420 may be offloaded to the PDSCH 404, thereby reducing the amount of information transmitted within the PDCCH 402, which may reduce complexity of decoding and power consumption at the UE.

As shown in FIG. 4, the scheduled DCI message 420 may be transmitted within the PDSCH 404. For example, the scheduled DCI message 420 may be transmitted using resources indicated by the resource allocation indicated in the scheduling DCI message 410, which are a subset of the resources allocated to the PDSCH 404. The scheduled DCI message 420 may include or correspond to a single DCI message or multiple individual DCI messages. For example, as shown in FIG. 4, the scheduled DCI message 420 may include a first individual DCI message 422, a second individual DCI message 424, and an Nth DCI message 426 (where N may be any positive integer). Although three individual DCI messages are illustrated in FIG. 4, in other examples, the scheduled DCI message 420 may include fewer than three or more than three individual DCI messages. In some implementations, as shown in FIG. 4, the scheduled DCI message 420 is allocated to a group of contiguous resources within the PDSCH 404. In other implementations, the scheduled DCI message 420 may be allocated to multiple noncontiguous groups of resources within the PDSCH 404.

Figure 5:
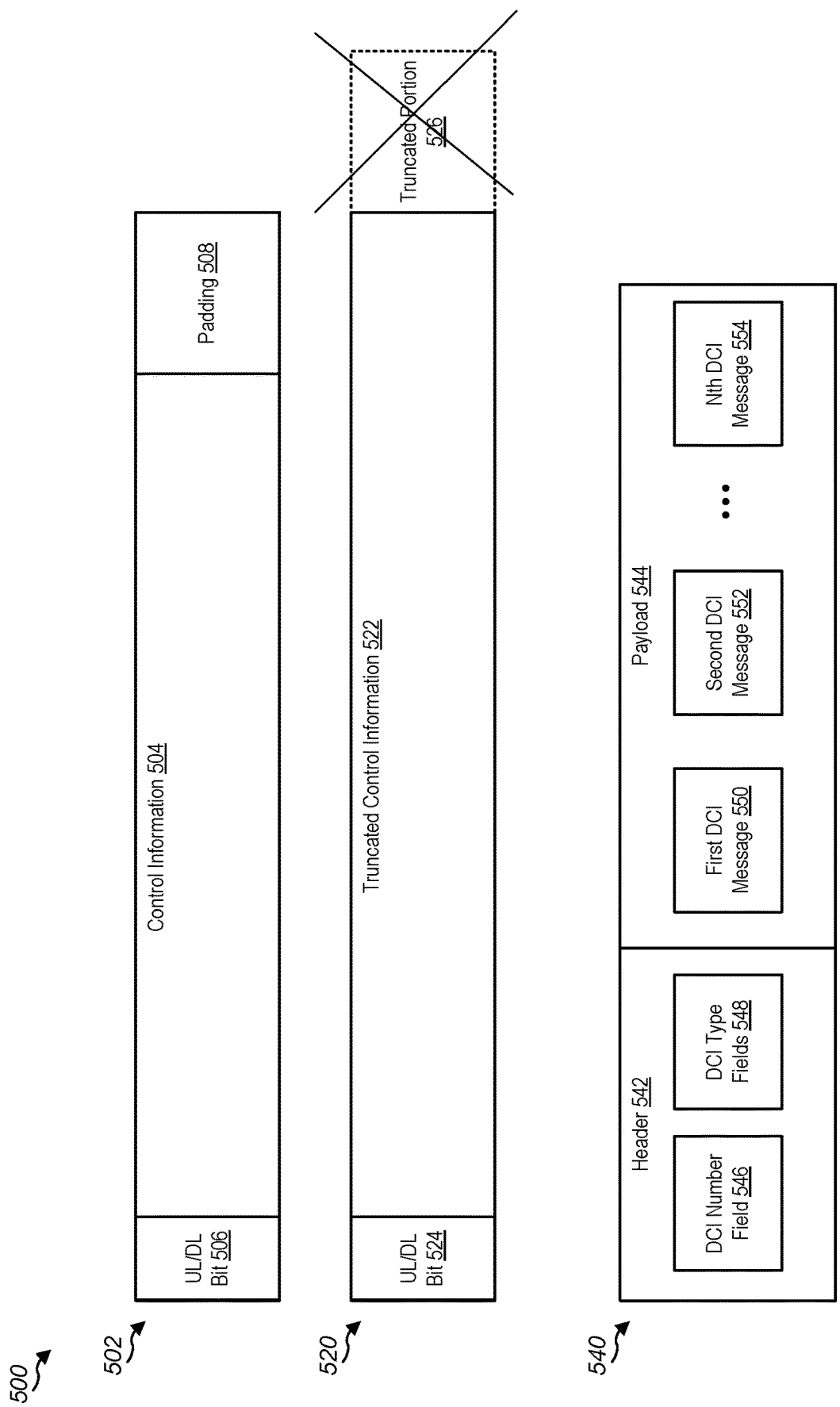
FIG. 5 is a diagram of examples of DCI messages according to some aspects.

FIG. 5 is a diagram of examples of DCI messages 500 according to some aspects. In some implementations, the DCI messages 500 may be transmitted to a UE by a base station, such as to the UE 115 by the base station 105 of FIG. 3. The DCI messages 500 include a first DCI message 502, a second DCI message 520, and a third DCI message 540. The first DCI message 502 and the second DCI message 520 are examples of DCI messages that may be transmitted within a PDCCH. The first DCI message 502 includes control information 504 for the UE. In some implementations, the control information 504 may include one or more bits indicating information associated with the first DCI message 502, similar to or also referred to as a header. For example, the control information 504 may include a UL/DL bit 506 that is configured to indicate whether the first DCI message 502 is associated with a UL communication or a DL communication. For example, if the UL/DL bit 506 has a first value, such as a logical zero value, the control information 504 is associated with a UL communication. Alternatively, if the UL/DL bit 506 has a second value, such as a logical one value, the control information 504 is associated with a DL communication. Similarly, the second DCI message 520 may include control information 522. In some implementations, the control information 522 may include one or more bits indicating information associated with the second DCI message 520. For example, the control information 522 may include a UL/DL bit 524 that is configured to indicate whether the second DCI message 520 is associated with a UL communication or a DL communication.

Because the first DCI message 502 and the second DCI message 520 are transmitted within a PDCCH, the UE may perform blind decoding to receive and decode the first DCI message 502 and the second DCI message 520. To reduce decoding complexity at the UE, the base station may perform one or more operations to conform the first DCI message 502 and the second DCI message 520 to a target size, also referred to as a size hypothesis, used by the UE to blindly decode messages received within the PDCCH. If the size of a DCI message is the same as the size hypothesis, the base station may not perform any operations. If the size of the DCI message is less than the size hypothesis, the base station may append one or more padding bits to the DCI message. For example, in FIG. 5, the size of the first DCI message 502 is less than the size hypothesis, and the base station may append padding bits 508 to the control information 504 such that a total size of the first DCI message 502 (a sum of the sizes of the control information 504 and the padding bits 508) matches the size hypothesis. If the size of the DCI message is greater than the size of the hypothesis, the base station may truncate a payload of the DCI message. For example, in FIG. 5, the size of the second DCI message 520 is greater than the size hypothesis, and the base station truncates the control information 522 by omitting a truncated portion 526 from the second DCI message 520. The size of the truncated control information 522 may be selected such that a total size of the second DCI message 520 (the size of the truncated control information 522) matches the size hypothesis. Although the truncated portion 526 is shown as being a trailing part of the second DCI message 520, in other implementations, the second DCI message 520 may be truncated by omitting any fields or bits of the second DCI message 520.

The third DCI message 540 may include a header 542 and a payload 544. The header 542 may include information associated with the payload 544, and the payload 544 may include control information for the UE. In some implementations, the payload 544 includes one or more individual DCI messages. In such implementations, the header 542 may include information associated with the one or more individual DCI messages. For example, the header 542 may include a DCI number field 546, DCI type fields 548, other information, or a combination thereof, and the payload 544 may include a first individual DCI message 550, a second individual DCI message 552, and an Nth individual DCI message 554 (where N may be any positive integer). The DCI number field 546 may indicate the number of individual DCI messages included in the payload 544. For example, the DCI number field 546 may include or indicate N. The DCI type fields 548 may indicate DCI types associated with the individual DCI messages 550-554, as further described above with reference to FIG. 3. For example, DCI type fields 548 may include a first DCI type field that indicates a first DCI type associated with the first individual DCI message 550, a second DCI type field that indicates a second DCI type associated with the second individual DCI message 552, and an Nth DCI type field that indicates an Nth DCI type associated with the Nth individual DCI message 554. The DCI types associated with the individual DCI messages 550-554 may be all the same DCI type, or at least one of the DCI types may be different than other DCI types.

The third DCI message 540 may be transmitted within a PDSCH. Because the third DCI message 540 is transmitted within a PDSCH instead of a PDCCH, the third DCI message 540 may have multiple differences when compared to the first DCI message 502 or the second DCI message 520. For example, the third DCI message 540 may not include a UL/DL bit in the header 542. The UL/DL bit may not be necessary, because whether an individual DCI message is associated with UL or DL communications may be indicated by an associated DCI type field. As another example, the base station may not append padding bits to the third DCI message 540 or truncate the payload 544 of the third DCI message 540. To illustrate, because the third DCI message 540 is not blind decoded by the UE, the base station may not add padding bits or truncate the payload 544 because the total size of the third DCI message 540 does not need to match any size hypothesis. Instead, the UE may determine the total size of the third DCI message 540 based on the DCI number field 546, the DCI types indicated by the DCI type fields 548 and higher-layer information associated with the DCI types, as described above with reference to FIG. 3, and the UE may use the determined size to decode the third DCI message 540 instead of performing blind decoding using a size hypothesis.

Figure 6:
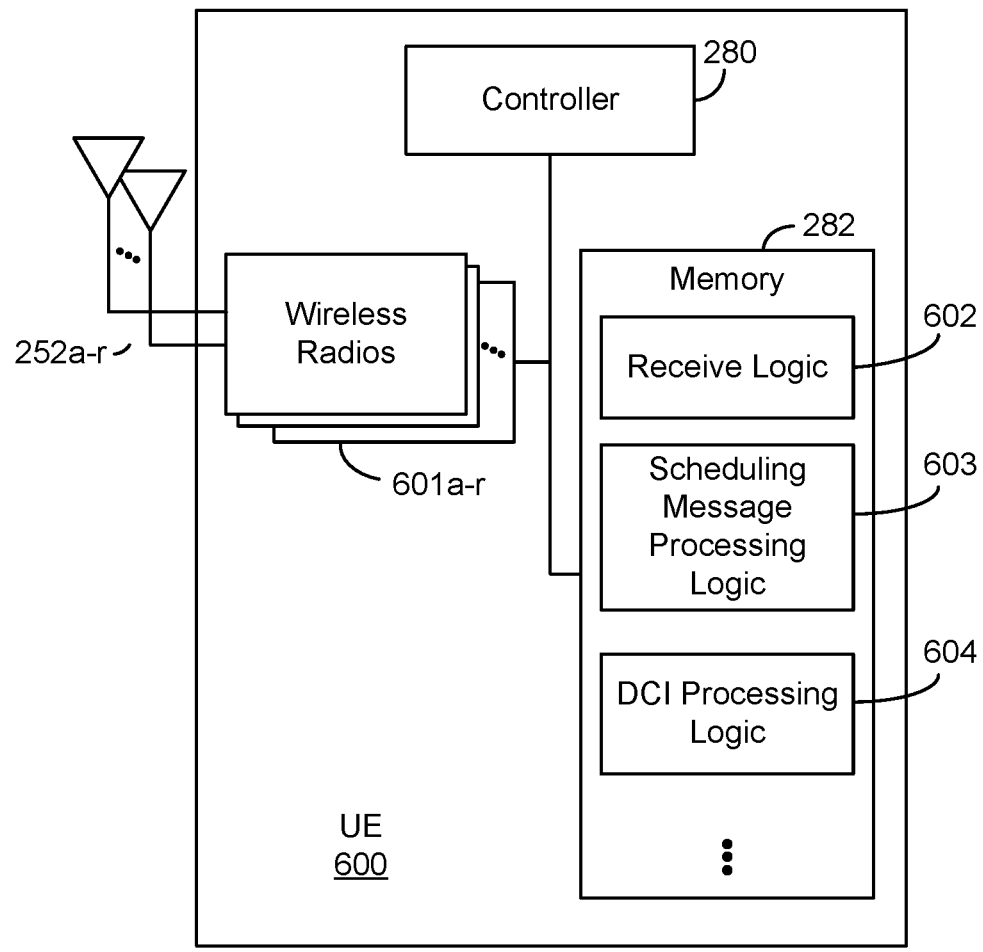
FIG. 6 is a block diagram of an example UE that supports receiving a DCI message within a PDSCH according to some aspects.

FIG. 6 is a block diagram of an example UE 600 that supports receiving a DCI message within a PDSCH according to some aspects. The UE 600 may be configured to perform operations, including the blocks of a process described with reference to FIG. 7, to receive a DCI message within a PDSCH. In some implementations, the UE 600 includes the structure, hardware, and components shown and described with reference to the UE 115 of FIG. 2 or 3. For example, the UE 600 includes the controller 280, which operates to execute logic or computer instructions stored in the memory 282, as well as controlling the components of the UE 600 that provide the features and functionality of the UE 600. The UE 600, under control of the controller 280, transmits and receives signals via wireless radios 601*a-r* and the antennas 252*a-r*. The wireless radios 601*a-r* include various components and hardware, as illustrated in FIG. 2 for the UE 115, including the modulator and demodulators 254*a-r*, the MIMO detector 256, the receive processor 258, the transmit processor 264, and the TX MIMO processor 266.

Figure 8:
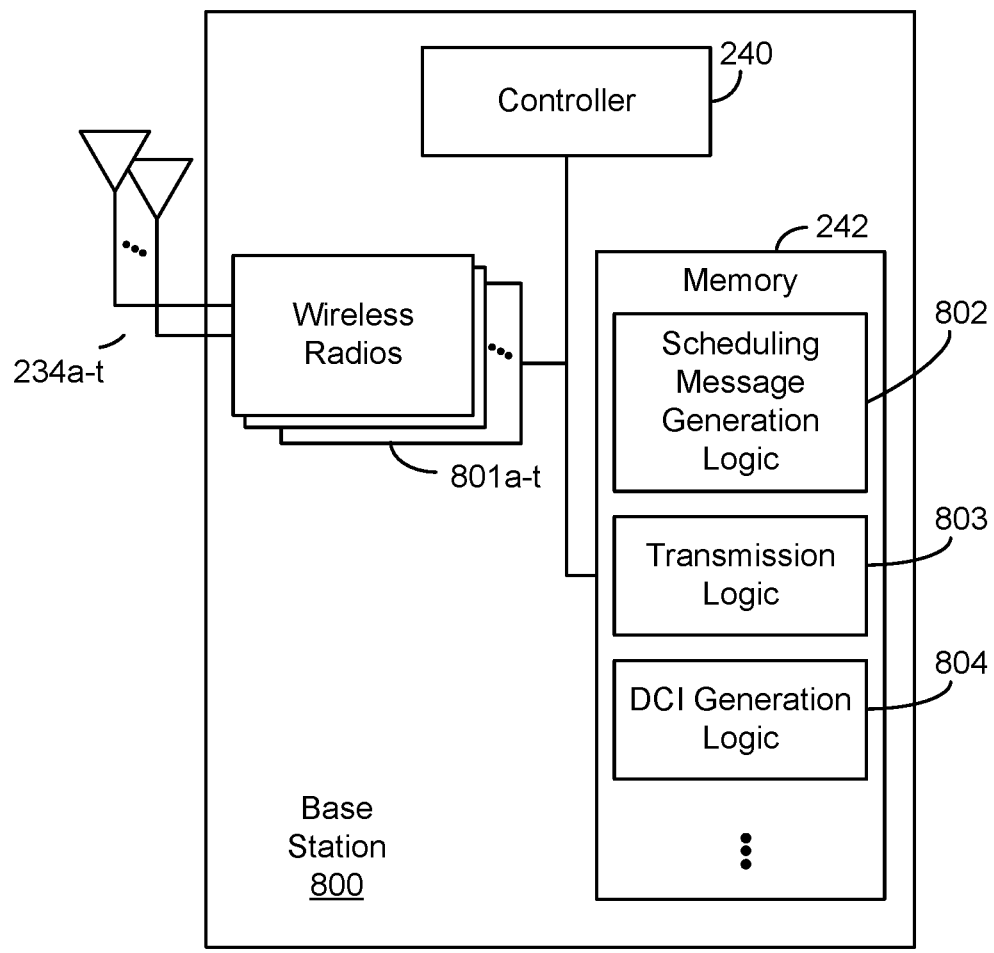
FIG. 8 is a block diagram of an example base station that supports transmitting a DCI message within a PDSCH according to some aspects.

As shown, the memory 282 may include receive logic 602, scheduling message processing logic 603, and DCI processing logic 604. The receive logic 602 may be configured to enable receipt of one or more signals, data, or information from a base station, such as a scheduling DCI message and a DCI message, as non-limiting examples. The scheduling message processing logic 603 may be configured to process a scheduling message received in a PDCCH. The DCI processing logic 604 may be configured to process received DCI messages. The UE 600 may receive signals from or transmit signals to one or more network entities, such as the base station 105 of FIGS. 1-3 or a base station as illustrated in FIG. 8.

Figure 7:
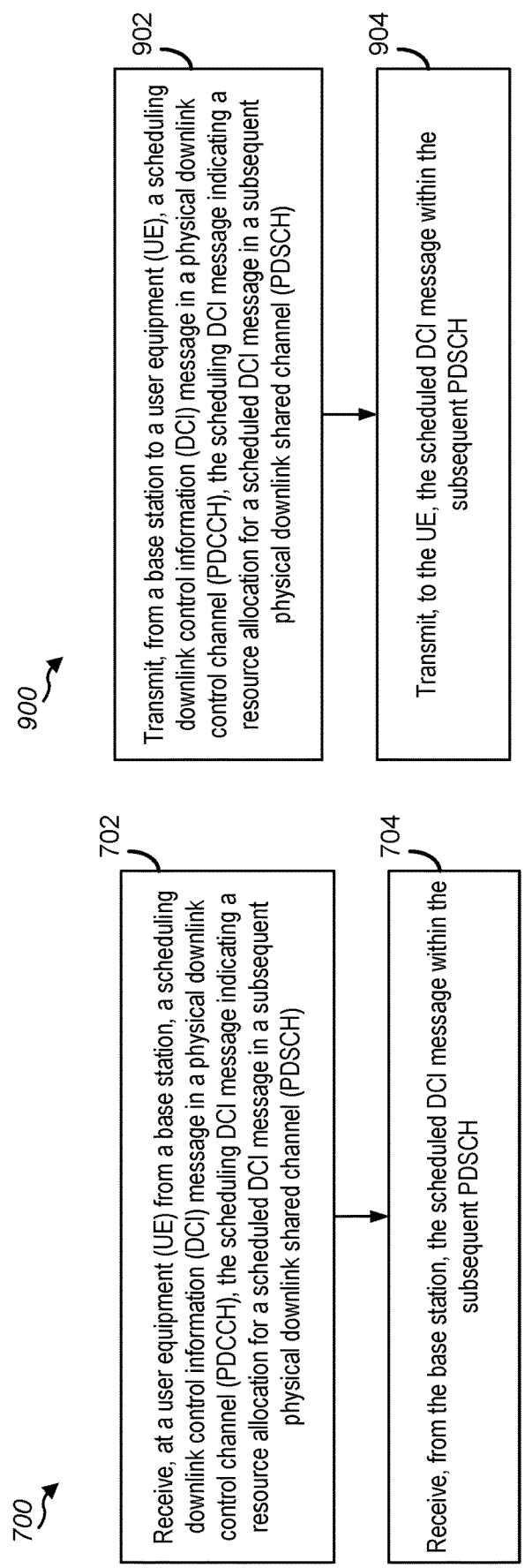
FIG. 7 is a flow diagram illustrating an example process that supports receiving a DCI message within a PDSCH according to some aspects.

FIG. 7 is a flow diagram illustrating an example process 700 that supports receiving a DCI message within a PDSCH according to some aspects. Operations of the process 700 may be performed by a UE, such as the UE 115 described above with reference to FIGS. 1-3 or the UE 600 described above with reference to FIG. 6. For example, example operations (also referred to as "blocks") of the process 700 may enable the UE 600 to receive a DCI message within a PDSCH.

In block 702, the UE 600 receives, from a base station, a scheduling DCI message in a PDCCH. The scheduling DCI message indicates a resource allocation for a scheduled DCI message, also referred to as a piggyback DCI message, in a subsequent PDSCH. For example, the UE 600 may receive a scheduling DCI message in a PDCCH from a base station using the wireless radios 601*a-r* and the antennas 252*a-r*, and by executing the receive logic 602 and the scheduling message processing logic 603. To further illustrate, the UE 600 may execute, under control of the controller 280, the receive logic 602 and the scheduling message processing logic 603 stored in the memory 282. The execution environment of the receive logic 602 provides the functionality to receive a scheduling DCI message from a base station in a PDCCH. The execution environment of the scheduling message processing logic 603 provides the functionality to process the scheduling DCI message received in the PDCCH. The scheduling DCI message indicates a resource allocation for a scheduled DCI message in a subsequent PDSCH.

In block 704, the UE 600 receives, from the base station, the scheduled DCI message within the subsequent PDSCH. For example, the UE 600 may receive the scheduled DCI message in the subsequent PDSCH from the base station using the wireless radios 601*a-r* and the antennas 252*a-r*, and by executing the receive logic 602 and the DCI processing logic 604. To further illustrate, the UE 600 may execute, under control of the controller 280, the receive logic 602 and the DCI processing logic 604 stored in the memory 282. The execution environment of the receive logic 602 provides the functionality to receive the subsequent PDSCH from the base station, and to receive the scheduled DCI message within the subsequent PDSCH. The execution environment of the DCI processing logic 604 provides the functionality to process the scheduled DCI message, such as processing a header and one or more individual DCI messages included in the scheduled DCI message.

In some implementations, the scheduled DCI message includes a header that is located prior to one or more individual DCI messages within the scheduled DCI message. In some such implementations, the process 700 also includes determining a number of individual DCI messages included in the scheduled DCI message based on a DCI number field included in the header. Additionally or alternatively, the process 700 may also include determining one or more DCI types associated with the one or more individual DCI messages based on one or more DCI type fields included in the header. Determining the one or more DCI types may include determining a first DCI type associated with a first individual DCI message of the one or more individual DCI messages based on a first DCI type field of the one or more DCI type fields, and determining a second DCI type associated with a second individual DCI message of the one or more individual DCI messages based on a second DCI type field of the one or more DCI type fields. The first DCI type may be different than the second DCI type. In some such implementations, the process 700 may further include determining sizes of the one or more individual DCI messages based on the one or more DCI types and higher-layer configurations associated with the one or more DCI types, and processing the one or more individual DCI messages based at least in part on the sizes.

In some implementations, at least one individual DCI message included in the scheduled DCI message omits a particular bit configured to indicate whether the at least one individual DCI message is associated with uplink communications or downlink communications, omits padding bits, is not truncated, or a combination thereof. Additionally or alternatively, each individual DCI message included in the scheduled DCI message may be associated with a corresponding DCI type selected from a group of DCI types defined for inclusion within PDCCHs, or from a subset of the group of DCI types.

In some implementations, at least one individual DCI message included in the scheduled DCI message is associated with a DCI type selected from a group of DCI types defined for inclusion in PDSCHs. In some such implementations, the scheduled DCI message may include a header that includes at least one DCI type field indicating DCI types associated with the at least one individual DCI message, and the at least one DCI type field may have a larger size than a DCI type field indicating a DCI type included in a group of DCI types defined for inclusion within PDCCHs. Additionally or alternatively, the DCI type associated with the at least one individual DCI message may be a group-common DCI type, and the at least one individual DCI message may include information for a single UE. Additionally or alternatively, the at least one individual DCI message may include information designated to be relayed by the UE to one or more other UEs via SL communications.

FIG. 8 is a block diagram of an example base station 800 that supports transmitting a DCI message within a PDSCH according to some aspects. The base station 800 may be configured to perform operations, including the blocks of a process described with reference to FIG. 9, to transmit a DCI message within a PDSCH. In some implementations, the base station 800 includes the structure, hardware, and components shown and described with reference to the base station 105 of FIGS. 1-3. For example, the base station 800 may include the controller 240, which operates to execute logic or computer instructions stored in the memory 242, as well as controlling the components of the base station 800 that provide the features and functionality of the base station 800. The base station 800, under control of the controller 240, transmits and receives signals via wireless radios 801*a-t* and the antennas 234*a-t*. The wireless radios 801*a-t* include various components and hardware, as illustrated in FIG. 2 for the base station 105, including the modulator and demodulators 232*a-t*, the transmit processor 220, the TX MIMO processor 230, the MIMO detector 236, and the receive processor 238.

As shown, the memory 242 may include scheduling message generation logic 802, transmission logic 803, and DCI generation logic 804. The scheduling message generation logic 802 may be configured to generate a scheduling DCI message. The transmission logic 803 may be configured to enable transmission of signals, data, or information, such as a scheduling DCI message and a DCI message, as non-limiting examples. The DCI generation logic 804 may be configured to generate a DCI message for transmission to a UE, such as within a PDSCH. The base station 800 may receive signals from or transmit signals to one or more UEs, such as the UE 115 of FIGS. 1-3 or the UE 600 of FIG. 6.

FIG. 9 is a flow diagram illustrating an example process 900 that supports transmitting a DCI message within a PDSCH according to some aspects. Operations of the process 900 may be performed by a base station, such as the base station 105 described above with reference to FIGS. 1-3 or the base station 800 as described above with reference to FIG. 8. For example, example operations of the process 900 may enable the base station 800 to transmit a DCI message within a PDSCH.

In block 902, the base station 800 transmits, to a UE, a scheduling DCI message in a PDCCH. The scheduling DCI message indicates a resource allocation for a scheduled DCI message in a subsequent PDSCH. For example, the base station 800 may transmit a scheduling DCI message in a PDCCH to a UE using the wireless radios 801*a-t* and the antennas 234*a-t*, and by executing the scheduling message generation logic 802 and the transmission logic 803. To further illustrate, the base station 800 may execute, under control of the controller 240, the scheduling message generation logic 802 and the transmission logic 803 stored in the memory 242. The execution environment of the scheduling message generation logic 802 provides the functionality to generate a scheduling DCI message. The execution environment of the transmission logic 803 provides the functionality to transmit the scheduling DCI message to a UE in a PDCCH. The scheduling DCI message indicates a resource allocation for a scheduled DCI message in a subsequent PDSCH.

In block 904, the base station 800 transmits, to the UE, the scheduled DCI message within the subsequent PDSCH. For example, the base station 800 may transmit the scheduled DCI message within the subsequent PDSCH to the UE using the wireless radios 801*a-t* and the antennas 234*a-t*, and by executing the transmission logic 803 and the DCI generation logic 804. To further illustrate, the base station 800 may execute, under control of the controller 240, the transmission logic 803 and the DCI generation logic 804 stored in the memory 242. The execution environment of the DCI generation logic 804 provides the functionality to generate a DCI message for transmission within a PDSCH. The execution environment of the transmission logic 803 provides the functionality to transmit the subsequent PDSCH to the UE, and to transmit the scheduled DCI message within the subsequent PDSCH.

In some implementations, the scheduled DCI message includes a header that is located prior to one or more individual DCI messages within the scheduled DCI message. The header may include a DCI number field that indicates a number of individual DCI messages included in the scheduled DCI message, one or more DCI type fields that indicate the one or more DCI types associated with the one or more individual DCI messages, or a combination thereof.

In some implementations, the process 900 also includes selecting one or more individual DCI messages for inclusion in the scheduled DCI message based on the resource allocation, a modulation order associated with the scheduled DCI message, a code rate associated with the scheduled DCI message, a reliability requirement associated with the scheduled DCI message, or a combination thereof. Additionally or alternatively, the process 900 may also include determining a size of the scheduled DCI message, and, based on a determination that a total size of a header and one or more individual DCI messages included in the scheduled DCI message is less than the size of the scheduled DCI message, including one or more padding bits in the scheduled DCI message subsequent to the one or more individual DCI messages. The scheduling DCI message may indicate the size of the scheduled DCI message.

It is noted that one or more blocks (or operations) described with reference to FIGS. 7 and 9 may be combined with one or more blocks (or operations) described with reference to another of the figures. For example, one or more blocks (or operations) of FIG. 7 may be combined with one or more blocks (or operations) of FIG. 9. As another example, one or more blocks associated with FIG. 7 or 9 may be combined with one or more blocks (or operations) associated with FIG. 2 or 3. Additionally, or alternatively, one or more operations described above with reference to FIGS. 1-7 and 9 may be combined with one or more operations described with reference to FIG. 8.

In some aspects, techniques for enabling transmission and receipt of a DCI message within a PDSCH may include additional aspects, such as any single aspect or any combination of aspects described below or in connection with one or more other processes or devices described elsewhere herein. In some aspects, enabling transmission and receipt of a DCI within a PDSCH may include an apparatus configured to receive, from a base station, a scheduling DCI message in a PDCCH. The scheduling DCI message indicates a resource allocation for a scheduled DCI message in a subsequent PDSCH. The apparatus is further configured to receive, from the base station, the scheduled DCI message within the subsequent PDSCH. In some implementations, the apparatus includes a wireless device, such as a UE. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein.

In a first aspect, the scheduled DCI message comprises a header that is located prior to one or more individual DCI messages within the scheduled DCI message.

In a second aspect, in combination with the first aspect, the apparatus determines a number of individual DCI messages included in the scheduled DCI message based on a DCI number field included in the header.

In a third aspect, in combination with one or more of the first through second aspects, the apparatus determines one or more DCI types associated with the one or more individual DCI messages based on one or more DCI type fields included in the header. Determining the one or more DCI types comprises determining a first DCI type associated with a first individual DCI message of the one or more individual DCI messages based on a first DCI type field of the one or more DCI type fields and determining a second DCI type associated with a second individual DCI message of the one or more individual DCI messages based on a second DCI type field of the one or more DCI type fields. The first DCI type is different than the second DCI type.

In a fourth aspect, in combination with the third aspect, the apparatus determines sizes of the one or more individual DCI messages based on the one or more DCI types and higher-layer configurations associated with the one or more DCI types, and processes the one or more individual DCI messages based at least in part on the sizes.

In a fifth aspect, alone or in combination with one or more of the first through fourth aspects, at least one individual DCI message included in the scheduled DCI message omits a particular bit configured to indicate whether the at least one individual DCI message is associated with uplink communications or downlink communications, omits padding bits, is not truncated, or a combination thereof.

In a sixth aspect, alone or in combination with one or more of the first through fifth aspects, each individual DCI message included in the scheduled DCI message is associated with a corresponding DCI type selected from a group of DCI types defined for inclusion within PDCCHs, or from a subset of the group of DCI types.

In a seventh aspect, alone or in combination with one or more of the first through sixth aspects, at least one individual DCI message included in the scheduled DCI message is associated with a DCI type selected from a group of DCI types defined for inclusion in PDSCHs.

In an eighth aspect, in combination with the seventh aspect, the scheduled DCI message comprises a header that includes at least one DCI type field indicating DCI types associated with the at least one individual DCI message. The at least one DCI type field has a larger size than a DCI type field indicating a DCI type included in a group of DCI types defined for inclusion within PDCCHs.

In a ninth aspect, alone or in combination with one or more of the seventh through eighth aspects, the DCI type associated with the at least one individual DCI message is a group-common DCI type, and the at least one individual DCI message includes information for a single UE.

In a tenth aspect, alone or in combination with one or more of the seventh through ninth aspects, the at least one individual DCI message includes information designated to be relayed by the UE to one or more other UEs via SL communications.

In some aspects, an apparatus configured for wireless communication, such as a base station, is configured to transmit, to a UE, a scheduling DCI message in a PDCCH. The scheduling DCI message indicates a resource allocation for a scheduled DCI message in a subsequent PDSCH. The apparatus is further configured to transmit, to the UE, the scheduled DCI message within the subsequent PDSCH. In some implementations, the apparatus includes a wireless device, such as a base station. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein.

In an eleventh aspect, the scheduled DCI message comprises a header that is located prior to one or more individual DCI messages within the scheduled DCI message, and the header comprises a DCI number field that indicates a number of individual DCI messages included in the scheduled DCI message, one or more DCI type fields that indicate the one or more DCI types associated with the one or more individual DCI messages, or a combination thereof.

In a twelfth aspect, alone or in combination with the eleventh aspect, the apparatus selects one or more individual DCI messages for inclusion in the scheduled DCI message based on the resource allocation, a modulation order associated with the scheduled DCI message, a code rate associated with the scheduled DCI message, a reliability requirement associated with the scheduled DCI message, or a combination thereof.

In a thirteenth aspect, alone or in combination with one or more of the eleventh through twelfth aspects, the apparatus determines a size of the scheduled DCI message, and based on a determination that a total size of a header and one or more individual DCI messages included in the scheduled DCI message is less than the size of the scheduled DCI message, includes one or more padding bits in the scheduled DCI message subsequent to the one or more individual DCI messages. The scheduling DCI message indicates the size of the scheduled DCI message.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-9 include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, some other implementations are within the scope of the following claims. In some cases, the actions recited in the claims can be performed in a different order and still achieve desirable results.

As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method comprising:
    receiving, from a base station, a scheduling downlink control information (DCI) message in a physical downlink control channel (PDCCH), the scheduling DCI message indicating a resource allocation for a scheduled DCI message in a subsequent physical downlink shared channel (PDSCH);
    receiving, from the base station, the scheduled DCI message within the subsequent PDSCH;
    processing a first DCI type associated with a first individual DCI message of one or more individual DCI messages included in the scheduled DCI message based on a first DCI type field of one or more DCI type fields included in a header of the scheduled DCI message; and
    processing a second DCI type associated with a second individual DCI message of the one or more individual DCI messages based on a second DCI type field of the one or more DCI type fields, wherein the first DCI type is different than the second DCI type.

2. The method of claim 1, wherein the header is located prior to the one or more individual DCI messages within the scheduled DCI message.

3. The method of claim 1, further comprising determining a number of individual DCI messages included in the scheduled DCI message based on a DCI number field included in the header.

4. The method of claim 1, further comprising:
    determining sizes of the one or more individual DCI messages based on the one or more DCI types and higher-layer configurations associated with the one or more DCI types; and
    processing the one or more individual DCI messages based at least in part on the sizes.

5. The method of claim 1, wherein at least one individual DCI message included in the scheduled DCI message omits a particular bit configured to indicate whether the at least one individual DCI message is associated with uplink communications or downlink communications, omits padding bits, is not truncated, or a combination thereof.

6. The method of claim 1, wherein each individual DCI message included in the scheduled DCI message is associated with a corresponding DCI type selected from a group of DCI types defined for inclusion within PDCCHs, or from a subset of the group of DCI types.

7. The method of claim 1, wherein at least one individual DCI message included in the scheduled DCI message is associated with a DCI type selected from a group of DCI types defined for inclusion in PDSCHs.

8. The method of claim 7, wherein the one or more DCI type fields include at least one DCI type field indicating DCI types associated with the at least one individual DCI message, and wherein the at least one DCI type field has a larger size than a DCI type field indicating a DCI type included in a group of DCI types defined for inclusion within PDCCHs.

9. The method of claim 7, wherein the DCI type associated with the at least one individual DCI message is a group-common DCI type, and wherein the at least one individual DCI message includes information for a single UE.

10. The method of claim 7, wherein the at least one individual DCI message includes information designated to be relayed by the UE to one or more other UEs via sidelink (SL) communications.

11. A user equipment (UE) comprising:
    at least one processor; and
    a memory coupled with the at least one processor and storing processor-readable code that, when executed by the at least one processor, is configured to:
        receive, from a base station, a scheduling downlink control information (DCI) message in a physical downlink control channel (PDCCH), the scheduling DCI message indicating a resource allocation for a scheduled DCI message in a subsequent physical downlink shared channel (PDSCH);
        receive, from the base station, the scheduled DCI message within the subsequent PDSCH;
        process a first DCI type associated with a first individual DCI message of one or more individual DCI messages included in the scheduled DCI message based on a first DCI type field of one or more DCI type fields included in a header of the scheduled DCI message; and
        process a second DCI type associated with a second individual DCI message of the one or more individual DCI messages based on a second DCI type field of the one or more DCI type fields, wherein the first DCI type is different than the second DCI type.

12. The UE of claim 11, wherein the header is located prior to the one or more individual DCI messages within the scheduled DCI message.

13. The UE of claim 11, wherein the at least one processor is further configured to determine a number of individual DCI messages included in the scheduled DCI message based on a DCI number field included in the header.

14. The UE of claim 12, wherein the at least one processor is further configured to:
    determine sizes of the one or more individual DCI messages based on the one or more DCI types and higher-layer configurations associated with the one or more DCI types; and
    process the one or more individual DCI messages based at least in part on the sizes.

15. The UE of claim 11, wherein at least one individual DCI message included in the scheduled DCI message omits a particular bit configured to indicate whether the at least one individual DCI message is associated with uplink communications or downlink communications, omits padding bits, is not truncated, or a combination thereof.

16. The UE of claim 11, wherein each individual DCI message included in the scheduled DCI message is associated with a corresponding DCI type selected from a group of DCI types defined for inclusion within PDCCHs, or from a subset of the group of DCI types.

17. The UE of claim 11, wherein at least one individual DCI message included in the scheduled DCI message is associated with a DCI type selected from a group of DCI types defined for inclusion in PDSCHs.

18. The UE of claim 17, wherein the one or more DCI type fields include at least one DCI type field indicating DCI types associated with the at least one individual DCI message, and wherein the at least one DCI type field has a larger size than a DCI type field indicating a DCI type included in a group of DCI types defined for inclusion within PDCCHs.

19. The UE of claim 17, wherein the DCI type associated with the at least one individual DCI message is a group-common DCI type, and wherein the at least one individual DCI message includes information for a single UE.

20. The UE of claim 17, wherein the at least one individual DCI message includes information designated to be relayed by the UE to one or more other UEs via sidelink (SL) communications.

21. A method of wireless communication performed by base station, the method comprising:
    transmitting, to a user equipment (UE), a scheduling downlink control information (DCI) message in a physical downlink control channel (PDCCH), the scheduling DCI message indicating a resource allocation for a scheduled DCI message in a subsequent physical downlink shared channel (PDSCH);
    generating the scheduled DCI message that includes a header including one or more DCI type fields, the one or more DCI type fields including a first DCI type field and a second DCI type field, the first DCI type field indicating a first DCI type associated with a first individual DCI message of one or more individual DCI messages included in the scheduled DCI message, the second DCI type field indicating a second DCI type associated with a second individual DCI message of the one or more individual DCI messages and that is different than the first DCI type; and
    transmitting, to the UE, the scheduled DCI message within the subsequent PDSCH.

22. The method of claim 21, wherein the header is located prior to the one or more individual DCI messages within the scheduled DCI message, and wherein the header further comprises a DCI number field that indicates a number of individual DCI messages included in the scheduled DCI message.

23. The method of claim 21, further comprising selecting one or more individual DCI messages for inclusion in the scheduled DCI message based on the resource allocation, a modulation order associated with the scheduled DCI message, a code rate associated with the scheduled DCI message, a reliability requirement associated with the scheduled DCI message, or a combination thereof.

24. The method of claim 21, further comprising:
    determining a size of the scheduled DCI message, wherein the scheduling DCI message indicates the size of the scheduled DCI message; and
    based on a determination that a total size of the header and the one or more individual DCI messages included in the scheduled DCI message is less than the size of the scheduled DCI message, including one or more padding bits in the scheduled DCI message subsequent to the one or more individual DCI messages.

25. A base station comprising:
    at least one processor; and
    a memory coupled with the at least one processor and storing processor-readable code that, when executed by the at least one processor, is configured to:
        initiate transmission, to a user equipment (UE), of a scheduling downlink control information (DCI) message in a physical downlink control channel (PDCCH), the scheduling DCI message indicating a resource allocation for a scheduled DCI message in a subsequent physical downlink shared channel (PDSCH);
        generate the scheduled DCI message that includes a header including one or more DCI type fields, the one or more DCI type fields including a first DCI type field and a second DCI type field, the first DCI type field indicating a first DCI type associated with a first individual DCI message of one or more individual DCI messages included in the scheduled DCI message, the second DCI type field indicating a second DCI type associated with a second individual DCI message of the one or more individual DCI messages and that is different than the first DCI type; and
        initiate transmission, to the UE, of the scheduled DCI message within the subsequent PDSCH.

26. The base station of claim 25, wherein the header is located prior to the one or more individual DCI messages within the scheduled DCI message, and wherein the header further comprises a DCI number field that indicates a number of individual DCI messages included in the scheduled DCI message.

27. The base station of claim 25, wherein the at least one processor is further configured to select one or more individual DCI messages for inclusion in the scheduled DCI message based on the resource allocation, a modulation order associated with the scheduled DCI message, a code rate associated with the scheduled DCI message, a reliability requirement associated with the scheduled DCI message, or a combination thereof.

28. The base station of claim 25, wherein the at least one processor is further configured to:
    determine a size of the scheduled DCI message, wherein the scheduling DCI message indicates the size of the scheduled DCI message; and
    based on a determination that a total size of the header and the one or more individual DCI messages included in the scheduled DCI message is less than the size of the scheduled DCI message, include one or more padding bits in the scheduled DCI message subsequent to the one or more individual DCI messages.

* * * * *